United States Patent [19]

Fournier

[11] Patent Number: 4,997,215
[45] Date of Patent: Mar. 5, 1991

[54] CONCRETE PIPE ADAPTOR AND METHOD OF MAKING

[76] Inventor: Charles L. Fournier, 14329 SE. 266th St., Kent, Wash. 98042

[21] Appl. No.: 365,956

[22] Filed: Jun. 14, 1989

[51] Int. Cl.5 .......................... B28B 7/28; F16L 49/00
[52] U.S. Cl. .................................. 285/230; 285/345; 249/95; 249/184; 264/271.1; 264/275
[58] Field of Search ............ 285/230, 231, 332, 334.4, 285/345, 379; 249/11, 12, 10, 91, 95, 184; 277/152, 153, 156; 264/271.1, 274, 275

[56] References Cited

U.S. PATENT DOCUMENTS

| | | | |
|---|---|---|---|
| 776,612 | 12/1904 | Peck | 249/184 X |
| 1,623,539 | 4/1927 | Horten | 264/275 X |
| 1,664,941 | 4/1928 | Perkins | 285/230 |
| 2,871,031 | 1/1959 | Altemus et al. | 285/230 X |
| 3,727,876 | 4/1973 | Keyser | 249/184 |
| 3,758,066 | 9/1973 | Skinner et al. | 249/95 |
| 3,759,285 | 9/1973 | Yoakum | 137/363 |
| 3,787,061 | 1/1974 | Yoakum | 285/230 X |
| 3,796,406 | 3/1974 | Ditcher | 249/11 |
| 3,815,214 | 6/1974 | Kyle, Sr. | 249/11 X |
| 4,073,048 | 2/1978 | Ditcher | 450/29 |
| 4,103,901 | 8/1978 | Ditcher | 277/9.5 |
| 4,159,829 | 7/1979 | Ditcher | 285/230 X |
| 4,598,915 | 7/1986 | Gilbert | 285/230 X |
| 4,650,149 | 3/1987 | Poulette et al. | 249/11 |
| 4,702,645 | 10/1987 | Skinner et al. | 285/230 X |
| 4,854,543 | 8/1989 | Daigle et al. | 249/95 |

FOREIGN PATENT DOCUMENTS

| | | | |
|---|---|---|---|
| 290612 | 6/1965 | Netherlands | 285/230 |
| 537484 | 6/1941 | United Kingdom | 285/345 |

OTHER PUBLICATIONS

CertainTeed, "Price List".

Primary Examiner—Randolph A. Reese
Assistant Examiner—Jeffrey L. Thompson
Attorney, Agent, or Firm—Christensen, O'Connor, Johnson & Kindness

[57] ABSTRACT

An adaptor (10) having a concrete cylindrical body (12) with an axial bore (14) having a directional twin seal (24) cast within the body (12) to project into the axial bore (14). The bore (14) has a maximum diameter at each end (16, 18) of the body (12) that decreases to a minimum diameter at the center of the bore (14) where the seal (24) is positioned. The method of constructing the adaptor (10) includes the steps of placing a lower form (44) on a support member (40); placing a seal (54) on the lower form (44); placing an upper form (46) on the seal (54); and placing an outer cylinder (42) around the upper and lower forms (44,46) to create a space (58) into which liquid concrete is poured.

15 Claims, 2 Drawing Sheets

CONCRETE PIPE ADAPTOR AND METHOD OF MAKING

TECHNICAL FIELD

The present invention pertains to pipe fittings and, more particularly, to a concrete pipe fitting for coupling plastic pipe to a concrete structure such as a manhole, a pipe, or the like.

BACKGROUND OF THE INVENTION

Sewage and drainage systems typically use underground pipes to convey sewage, storm water, and other waste material to a treatment facility or waste disposal site. These pipes are routed through manholes at various locations. Manholes are used to provide access to the system for cleaning and repair. Manholes are also used when there is a change of grade or direction to maintain the proper flow of waste material.

In the past, sewage pipes have been formed of concrete. These concrete pipes were attached into the manhole and sealed in place with cement grout. Because concrete pipes are porous, they frequently do not remain watertight. In addition, concrete pipes tend to fracture when improperly backfilled. Because of public health concerns, regulations in many localities require that plastic or PVC pipe be used instead of concrete, and that all pipe connections achieve some degree of watertightness.

The use of plastic pipe with concrete manholes makes it very difficult to obtain a proper seal where the two come together because of the incompatibility of plastic and concrete. In one proposed method for overcoming this problem, a concrete cylinder with an axial bore is formed and a gasket is then rolled inside the bore. In some instances, the gasket is held in position in the bore by cutting a channel around the inside of the bore and then rolling the gasket in place in the channel.

This method has several disadvantages. First, when the plastic pipe is backfilled with soil, the weight pushing down on the pipe causes the pipe to crush the gasket at the bottom of the pipe, leaving a gap between the top of the pipe and the gasket. This gap also occurs when the pipe is not positioned perpendicular to the seal. In addition, the weight of the backfill causes movement of the pipe, which can crack the cylinder. As a result, these cylinders frequently fail to achieve or maintain a watertight connection. Furthermore, cutting a channel inside the bore of the pipe requires the use of carbon- or diamond-tipped cutting tools. This type of machining is expensive, time-consuming, and can weaken the concrete. The present invention is directed to overcoming these drawbacks.

SUMMARY OF THE INVENTION

The present invention is directed to an adaptor for coupling plastic pipe to a concrete structure, such as a manhole, a pipe, or the like. The adaptor comprises a concrete body having a longitudinal axial bore that opens to each end of the body. A flexible seal means is cast in the body to project into the axial bore.

In accordance with another aspect of the present invention, the flexible seal means comprises a one-piece flexible seal that circumscribes the bore and has at least one flange projecting into the bore. Preferably, the seal is a twin seal that has two flanges projecting into the bore.

In accordance with another aspect of the present invention, the inside diameter of the bore decreases from a maximum diameter at each end of the bore to a minimum diameter at the center of the bore.

In accordance with another aspect of the present invention, the method of constructing the adaptor comprises the steps of placing a lower form having a top surface onto a support member; placing a gasket on the top surface of the lower form; placing a top form on the gasket; placing a form around the lower and upper forms on the support member to create a space that circumscribes the lower and upper forms and into which a portion of the gasket projects; and pouring liquid concrete into the space.

In accordance with another aspect of the present invention, the method further comprises the step of placing a reinforcing wire mesh inside the space.

In accordance with yet another aspect of the present invention, the method further comprises the step of vibrating the support member to settle the concrete mixture in the space.

In accordance with yet another aspect of the present invention, the concrete mixture comprises two parts of coarse sand, one part of fine sand, and one and one-half parts of cement.

In accordance with an alternative method of constructing the present invention, the method comprises the steps of first placing a cylindrical form on a support member; placing a lower form inside the cylindrical form on the support member; placing a gasket on the top surface of the lower form; placing a top form on the gasket such that a space is created between the upper and lower forms and the cylindrical form and into which a portion of the gasket projects; and pouring liquid concrete into the space.

As will be readily appreciated from the foregoing description, the present invention provides an adaptor that is easily formed from concrete. Because the seal is cast into place, no additional labor or machining is required to insert the seal or to cut a channel for retaining the seal. The cone-shaped internal bore allows for variation in the alignment of the pipe in the adaptor, thus avoiding cracking or fracturing of the pipe or adaptor if the pipe should shift position after backfilling. Furthermore, affixing the adaptor to a manhole with liquid cement and using a directional twin seal achieves an air- and watertight condition that exceeds all government requirements.

BRIEF DESCRIPTION OF THE DRAWINGS

The foregoing and other features and advantages of the present invention will be more readily appreciated as the same becomes better understood by reference to the following detailed description when taken in conjunction with the following drawings, wherein.

DETAILED DESCRIPTION OF THE PREFERRED EMBODIMENT

Figure 1:
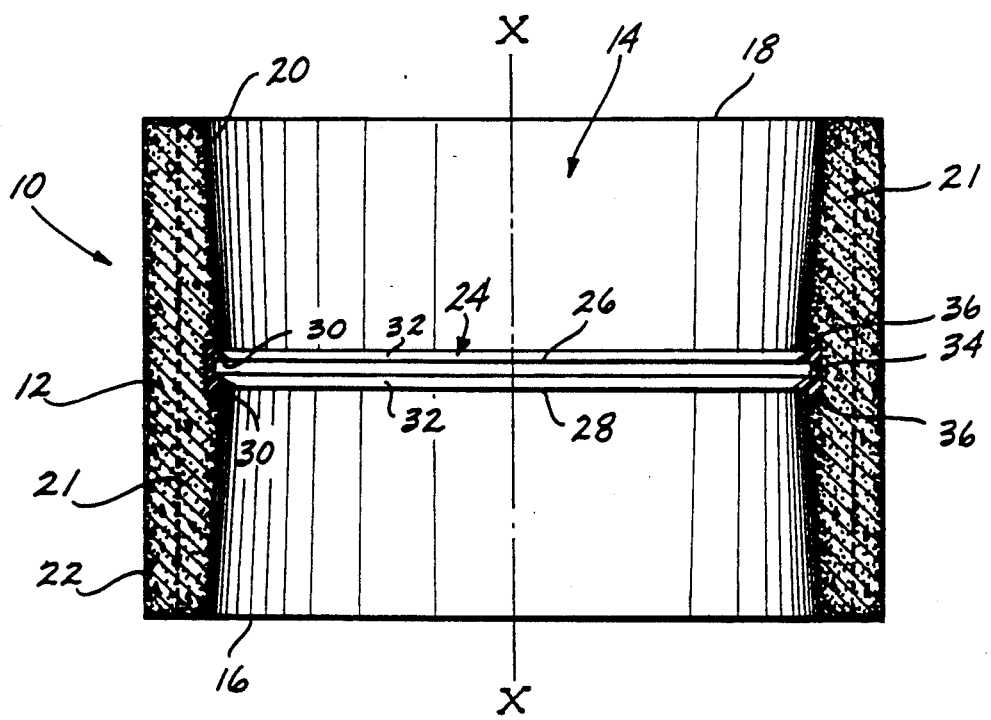
FIG. 1 is a cross-sectional side view of an adaptor formed in accordance with the present invention.
Figure 2:
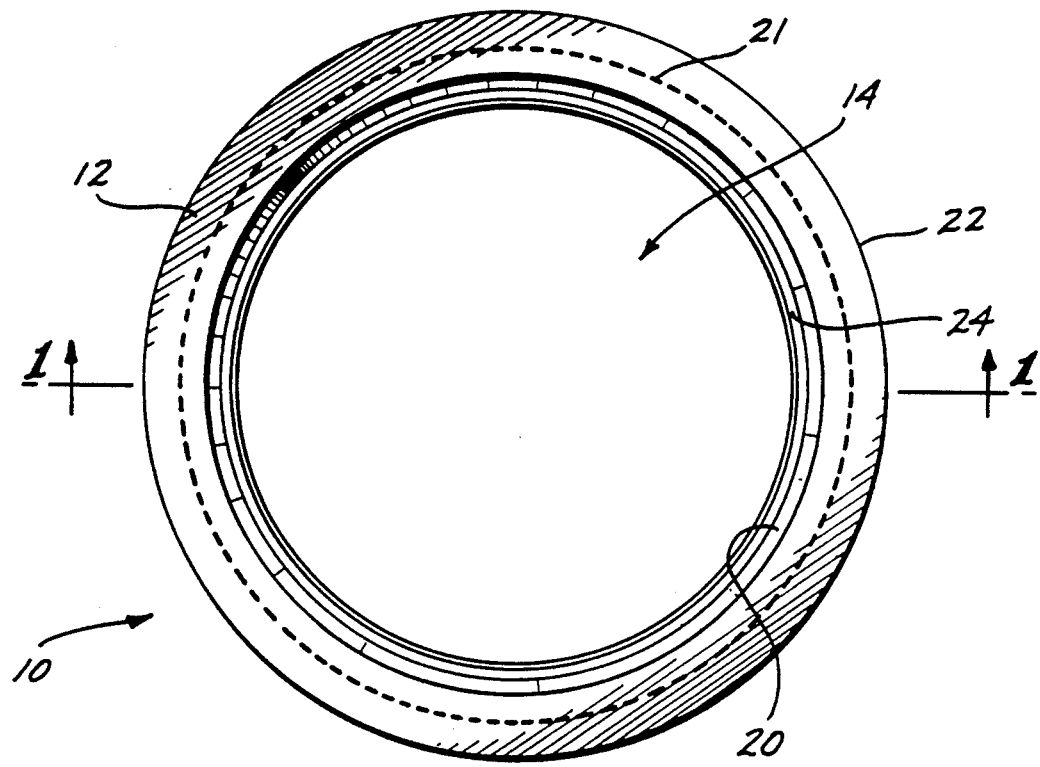
FIG. 2 is a top view of the adaptor of FIG. 1.

Referring initially to FIGS. 1 and 2, an adaptor 10 is shown having a generally cylindrical body 12. Preferably, the body 12 is formed of concrete. A longitudinal axial bore 14 is formed in the body 12 that communicates with first and second open ends 16 and 18. The inside and outside surfaces 20 and 22 of the body 12 have a smooth finish. A mesh screen 21 is disposed in the concrete body 12. As shown more clearly in FIG. 1, the inside diameter of the bore 14 decreases from a maximum diameter at each end 16 and 18 to a minimum diameter at the center of the bore 14. Ideally, the taper is one-fourth inch diameter for every four inches of length.

Cast in place on the inside surface 20 is a flexible seal 24 that circumscribes the internal bore 14. The seal 24 shown in the representative embodiment is a directional twin-seal that is well known in the art and commercially available. Consequently, it will not be described in detail. Briefly, the seal 14 is formed of neoprene or other similar pliable material. Two flanges 26 and 28 project into the bore 14. Each flange 26 and 28 has two faces, a first face 30 that lies in a plane perpendicular to the longitudinal axis X of the bottom 12, and a second face 32 that is inclined downward towards the first end 16 of the body 12, as shown more clearly in FIG. 1.

As such, a pipe inserted into the second end 18 will meet little resistance from the inclined second faces 32. However, the first faces 30 will resist movement of the pipe in the opposite direction, thus holding the pipe in place. The seal 24 further includes a body portion 34 with two projecting lips 36 that are encased on the concrete body 12 for holding the seal 14 in place.

Figure 3:
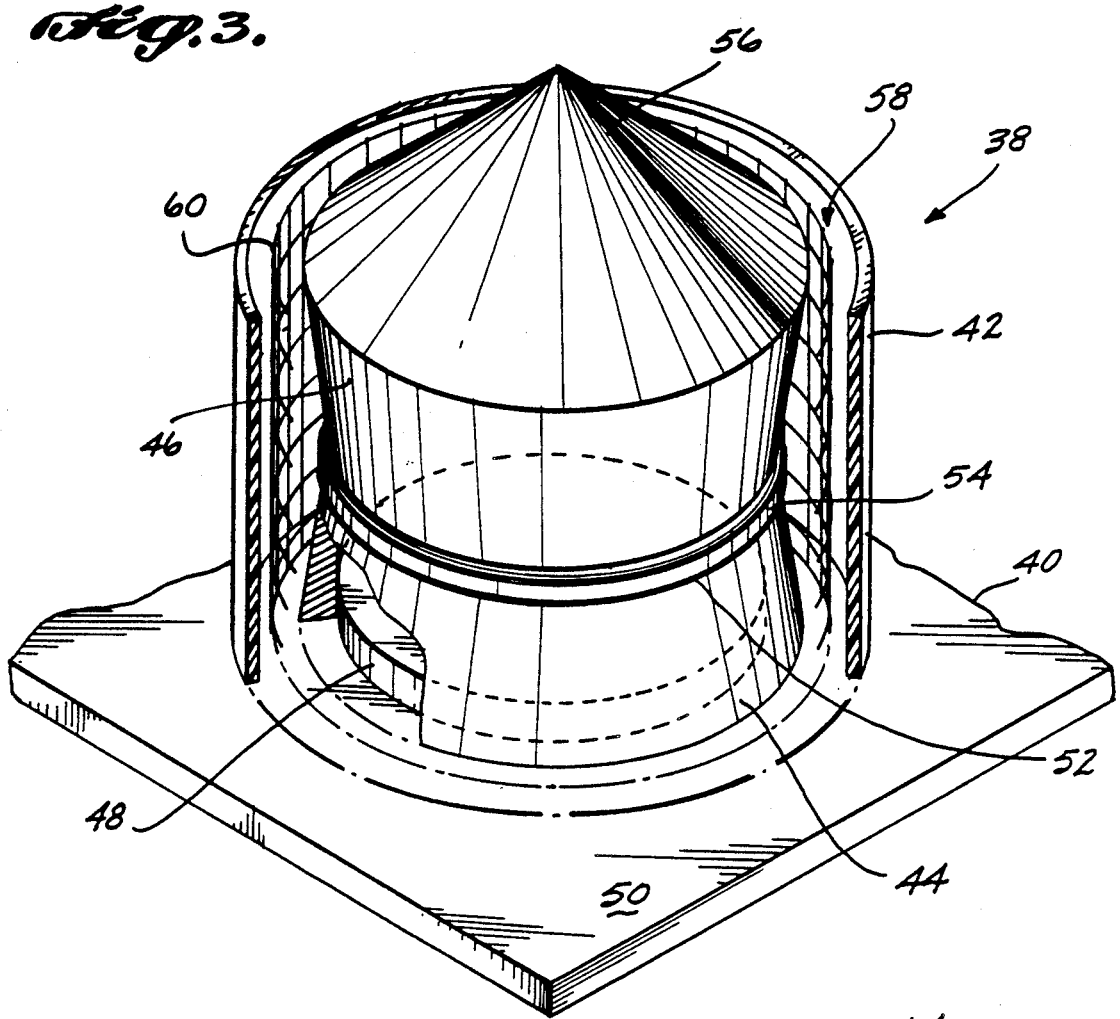
FIG. 3 is an isometric view in partial cutaway illustrating the form for making the adaptor of FIG. 1; and, FIG. 4 is a side view in partial cross section of the adaptor of FIG. 4 coupling a plastic pipe to a manhole.

The adaptor 14 so described in constructed using a unique form 38 shown in FIG. 3. The form 38 is comprised of a support base 40, an outer cylinder 42, a lower form 44, and an upper form 46. The support member 40 has a central raised portion 48 that projects upward from the top surface 50 of the support member 40. The lower form 44 is a hollow, truncated cone having an inside diameter at its base that is sized to fit over the raised portion 48.

The lower form 44 has a top surface 52 on which rests a seal 54 having the same configuration as the seal 24 described above. Placed on top of the seal 54 is the upper 46. The upper form 46 is also a truncated cone that is not necessarily hollow. When placed on the seal 54, the upper form 46 is inverted so that the base of the form 46 is facing upward. The upper and lower forms 44 and 46 are constructed to have a one-fourth-inch taper to every four inches of height. A cone 56 is placed on or integrally formed with the upper form 46 for directing liquid cement around the upper form 46. The outer cylinder 42 is placed on the top surface 50 of the support member 40 to circumscribe the lower and upper forms 44 and 46, thus forming a space 58 between the lower and upper forms 44 and 46. A wire mesh screen 60 is placed in the space 58 to circumscribe the lower and upper forms 44 and 46.

The steps of the method of constructing the adaptor 10 include the step of first placing the lower form 44 on the support member 40. To insure the lower form 44 remains in place when the liquid concrete is poured, the base of the lower form 44 is fitted over the raised portion 48 on the support member 40. Next, the seal 54 is placed on the top surface 52 of the lower form 44 so that the flanges (not shown) of the seal project outward from the lower form 44. In other words, the flanges project into the space 58 that will be created. Next, the upper form 46 is inverted and placed on top of the seal 54. Finally, if the cone 56 is formed separate from the upper form 46, is then placed around the lower and upper form 46. The outer cylinder 42 is then placed around the lower and upper forms 44 and 46 to create the space 58. If reinforcement is desired, the wire mesh screen 60 is then placed into the space 58 at a desired location. Finally, liquid concrete is then poured into the space 58 and allowed to harden. To insure the space 58 is free of air bubbles, the support member 40 may be vibrated with a shaker or other similar device that is well known in the art prior to hardening of the liquid cement.

The support member 40, the outer cylinder 42, and the upper and lower forms 44 and 46 may be constructed of wood, metal, plastic, cardboard, or other suitable material. The reinforcing mesh screen 60 is commercially available and may be cut from a preformed roll and hooked together. It has been fond that a mesh of 1"×2" has been suitable for this application. The mixture of the liquid concrete that has been found to be most suitable for the present invention consists of two parts coarse sand, one part fine sand, and one and one-half parts cement. This creates smooth surfaces on the body 12 for a better fit and unrestricted water flow.

Although the steps of the method of the present invention have been described in a certain order, it is to be understood that they may be performed in other orders without the departing from the spirit and scope of the present invention. For instance, the outer cylinder 42 may be placed on the support member 40 before or after the lower and upper forms 44 and 46 are in place. Similarly, the screen mesh 60 may be placed on the support member 40 before or after the outer cylinder 42 and the lower and upper forms 44 and 46. However, to insure proper spacing between the outer shell 42, the wire mesh 60, and the upper and lower forms 44 and 46, it is preferable that at least the lower form 44 be placed on the support member 40 first. However, this may not be required if positioning tabs are placed on the support member 40 to locate the position of the outer cylinder 42 and the wire mesh 60. Consequently, it is to be understood that the method of constructing the present invention may be performed otherwise than as described specifically herein without departing from the spirit and scope of the invention.

Figure 4:
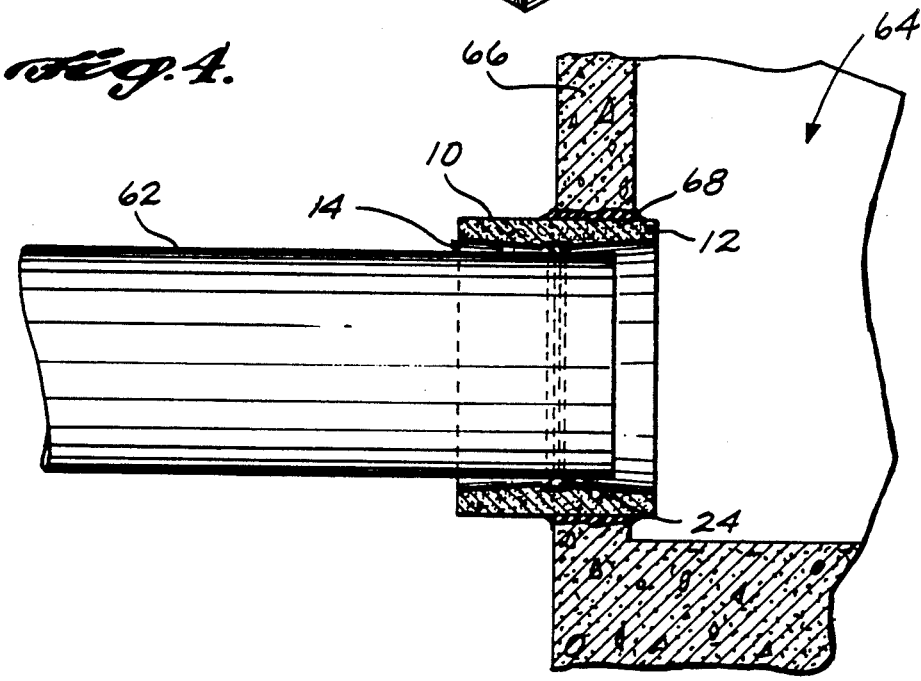

Turning now to FIG. 4, the adaptor 10 is shown in use coupling a plastic pipe 62 to a manhole 64. In most applications, the manhole 64 has preformed knockouts located at predetermined locations in its wall 66. These knockouts are removed by workers to create an opening that is sized to receive the adaptor 10. The adaptor 10 is held in place in the manhole 64 by cement grout 68, as shown. The adaptor 10 is positioned in the manhole 64 so that the directional seal 24 has the inclined faces inclined toward the manhole 64. As such, the plastic pipe 62 is easily inserted into the adaptor 10 and past the seal 24. The clearance 70 formed between the pipe 62 and the adaptor 10 by the cone-shaped bore 14 allows for variation in the directional orientation of the pipe 62 without destroying the watertight integrity of the seal 24.

While a preferred embodiment of the invention has been illustrated and described, it is to be understood that various changes may be made therein without departing from the spirit and scope of the invention. For instance, the adaptor 10 may be formed to have other cross-sectional shapes other than cylindrical or circular, such as square, hexagonal, etc. In addition, pressure grouting and/or pressure molding can also be used to fill the forms with cement grout. Furthermore, the wire mesh may be replaced with a fibrous material that is added to the grout for strength. Consequently, the invention is to be limited only by the scope of the claims which follow.

The embodiments of the invention in which an exclusive property or privilege is claimed are defined as follows:

1. A method of constructing an adaptor for coupling plastic pipe to a concrete structure comprising the following steps:
   placing a lower form having a top surface on a support member;
   placing a gasket on said top surface of said lower form;
   placing a top form on said gasket;
   placing an outer form generally concentrically around said lower and upper forms on said support member to circumscribe said upper and lower forms to form a space around said upper and lower forms into which a portion of said gasket projects; and
   pouring liquid concrete into said space.

2. The method of claim 1, further comprising the step of placing a reinforcing wire mesh inside said space.

3. The method of claim 1, further comprising the step of vibrating said support member to remove air bubbles from said concrete mixture.

4. A method of constructing the adaptor for coupling plastic pipe to a concrete structure such as a manhole, another pipe, or the like, the method comprising the steps of:
   placing a lower form having a top surface on a support member;
   placing a gasket on said top surface of said lower form so that flanges on said gasket project outside of said lower form;
   placing an upper form on said gasket;
   placing a reinforcing mesh around said upper and lower forms;
   placing an outer form on said support member generally concentrically around said upper and lower forms to circumscribe said upper and lower forms to form a space between said outer form and said upper and lower forms into which said gasket projects; and
   filling said space with a liquid concrete.

5. The method of claim 4, further comprising the step of vibrating said support member to settle said liquid concrete in said space.

6. The method of claim 4, further comprising the step of placing a reinforcing wire mesh in said space prior to pouring said liquid concrete mixture.

7. The method of claim 4, further comprising the step of vibrating said support member to settle said liquid concrete mixture in said space and to remove air bubbles from said liquid concrete mixture.

8. A method of constructing an adaptor for connecting plastic pipe to a concrete structure such as a manhole, a pipe, or the like, the method comprising the steps of:
   placing an outer form on a support member;
   placing a lower form on said support member generally concentrically within said outer form, said lower form having a top surface;
   placing a gasket on said top surface of said lower form so that flanges on said gasket project outward toward said outer form;
   placing an upper form on said gasket such that a space is formed between said outer form and said upper and lower forms; and
   pouring a liquid concrete mixture into said space.

9. An adaptor for connecting pipe to a concrete structure, said adaptor manufactured according to the steps of:
   constructing an inner form assembly including a first form, a second form positioned adjacent said first form, and a seal located between said first and second forms wherein a portion of said seal is disposed between said first and second inner forms and a portion of seal projects outward from said forms;
   placing an outer cylinder generally concentrically around said inner form assembly, said outer cylinder being separated from said inner form assembly to define a space therebetween;
   pouring a liquid concrete mixture into said space and allowing said mixture to harden so as to form a concrete body with an axial bore defined by said first and second inner forms; and
   removing said outer cylinder and removing said inner forms so that said seal is partially embedded in said concrete body and at least partially extends into said axial bore.

10. The adaptor of claim 9, wherein at least one of said first and second inner forms is configured to define an outwardly extending taper in said concrete body axial bore, said taper having a minimum diameter adjacent said seal.

11. The adaptor of claim 10, wherein said inner forms are configured to define a taper in said concrete body axial bore so that said concrete body axial bore has an outwardly extending taper adjacent each side of said seal.

12. The adaptor of claim 9, wherein said seal has at least two flanges extending into said concrete body axial bore.

13. The adaptor of claim 12, wherein said inner forms are configured to define a taper in said concrete body axial bore so that said concrete body axial bore has an outwardly extending taper adjacent each side of said seal.

14. The adaptor of claim 9 wherein said seal includes at least one directional flange projecting into said concrete body axial bore and facilitates insertion of a pipe into said bore in one direction and resists movement of said pipe in the opposite direction.

15. The adaptor of claim 14, wherein said inner forms are configured to define a taper in said concrete body axial bore so that said concrete body axial bore has an outwardly extending taper adjacent each side of said seal.

* * * * *

UNITED STATES PATENT AND TRADEMARK OFFICE
CERTIFICATE OF CORRECTION

PATENT NO. : 4,997,215

DATED : March 5, 1991

INVENTOR(S) : Charles L. Fournier

It is certified that error appears in the above-identified patent and that said Letters Patent is hereby corrected as shown below:

| Column | Line | |
|---|---|---|
| 57, Abstract | 13 | Delete "(44,46)" and insert therefor --(44, 46)-- |
| 3 | 68 | After "46," insert --the cone 56-- |
| 3 | 68 | Delete "around" and insert therefor --on-- |
| 3 | 68 | After "the" delete "lower and" |
| 4 | 16 | Delete "fond" and insert therefore --found-- |

Signed and Sealed this

Twenty-seventh Day of October, 1992

Attest:

DOUGLAS B. COMER

*Attesting Officer*    *Acting Commissioner of Patents and Trademarks*